3,081,353
PROCESS FOR THE PRODUCTION OF METHYL MERCAPTAN

Aldo Forni, Galliate, Novara, Italy, assignor to Montecatini Società Generale per l'Industria Mineraria e Chimica, a corporation of Italy
No Drawing. Filed Dec. 23, 1959, Ser. No. 861,433
Claims priority, application Italy Dec. 23, 1958
13 Claims. (Cl. 260—609)

The present invention relates primarily to a new process for the production of methyl mercaptan. It concerns particularly a catalytic process, improved in respect to the processes previously used, and suitable both for converting into methyl mercaptan a methanol and sulfurated hydrogen (hydrogen sulfide) mixture on an antimony sulfide ($Sb_2S_3$) catalyst supported by alumina and for transforming the dimethylsulfide by-product into the corresponding mercaptan.

The process comprises passing a mixture of alcohol, hydrogen sulfide and dialkyl sulfide over a catalyst comprising mainly an antimony sulfide supported by activated alumina. A variant comprises making methanol and hydrogen sulfide react in a first reactor; and in transforming the dimethylsulfide by-product into mercaptan in a second reactor on a catalyst comprising clay or activated alumina.

It is known that low molecular weight alkyl mercaptans, for example those having from 1 to 8 carbon atoms, are generally obtained by making the corresponding aliphatic alcohol react with hydrogen sulfide, using a catalyst or a mixture of catalysts: such as thorium, zirconium, uranium, molybdenum, chromium, or aluminum oxides, and iron, cobalt, cadmium or nickel sulfides. Most of these substances, alumina included, have a rather limited efficiency.

The preparation of methyl mercaptan is based on the following reaction:

(1) $CH_3OH + H_2S \rightleftarrows CH_3SH + H_2O$

However, besides the main reaction, a great number of other reactions are possible, the most important being:

(2) $2CH_3SH \rightleftarrows CH_3SCH_3 + H_2S$
(3) $2CH_3OH \rightleftarrows CH_3OCH_3 + H_2O$
(4) $CH_3OCH_3 + 2H_2S \rightleftarrows 2CH_3SH + H_2O$ The addition of the equilibria above indicated results in a condition of general equilibrium which defines the composition of the raw product.

It is therefore desired to operate so as to reduce to the minimum the formation of the dimethylether and dimethylsulfide by-products as well as to reutilize those compounds with the purpose of obtaining, from the operating cycle, the production of methyl mercaptan only.

Of the by-products considered above, dimethylether is generally obtained in very limited quantities and is easily recycled to the reactor along with the excess hydrogen sulfide without requiring its separation.

Much more important is the problem of reutilization of dimethylsulfide. That problem has so far been generally approached by recycling the $CH_3SCH_3$ back to the reactor along with the excess hydrogen sulfide and methanol. In that approach, the quantity of dimethylsulfide which is circulated depends upon the equilibrium of reaction (2), and since this reaction tends to be shifted towards the right there results a heavy recycle of sulfide and hydrogen sulfide. In fact, even with an antimony sulfide catalyst, operating at 275° C., no formation of dimethylsulfide took place when the feeding ratios were as follows: $CH_3OH/(CH_3)_2S = 3:1$ in mols and $H_2S/CH_3OH + (CH_3)_2S = 2:1$ in mols and a raw product was obtained containing 33% by weight of dimethylsulfide.

The problem has now been solved by this invention more conveniently by making the reaction (2) occur in a reversed direction in a second reactor using activated alumina or clay as catalyst.

In this way, the dimethylsulfide, a by-product from the first reactor, is separated during the distillation of the raw material and fed along with hydrogen sulfide to a second reactor where 25% to 30% is converted into methyl mercaptan.

The present invention includes, therefore, a process which can be accomplished in two ways and more precisely, through a simple cycle with a single reactor or with a two-reactor cycle.

The difference between the two variants consists mainly in the fact that, in the first case the dimethylsulfide is recycled back to the reactor in quantities corresponding to equilibrium (2), thus avoiding a further formation of the same. In the second case the dimethylsulfide produced is converted into mercaptan, making the reaction (2) take place from the right to the left in a second reactor of limited size. A minor circulation of products and a lower cost of the catalyst are thus obtained.

The main reaction is carried out in a vapor phase at a catalyst temperature of about 200° to 400° C. and preferably at a temperature of about 250° to 320° C. which is the optimum condition for the preparation of methyl mercaptan.

The space velocity of the reagents considered as vapors on the catalyst varies from 20 to 300 "normal" liters per hour per liter ($N_{lt.}/h./lt.$) of catalyst; the optimum velocity depends upon the temperature, the $H_2S/CH_3OH$ ratio and the activity of the catalyst.

The ratio in mols $H_2S/CH_3OH$ (or $H_2S/CH_3OH + (CH_3)_2S$)

may vary within wide limits (for instance, from 1:1 to 20:1); it is, however, preferable to use ratios relatively low (1.5:1 to 3:1) which constitute the optimum values for a good economical process.

The reaction is preferably carried out under atmospheric pressure, although no limitations exist as to the use of lower or higher pressures, provided the reagents and the reaction products are always maintained in a vapor phase.

From the above, the advantages of the process according to the invention may be seen, and more particularly the use of non-elevated temperatures which result in less losses deriving from methanol decomposition and the use of comparatively low $H_2S/CH_3OH$ ratios with a clear economy by $H_2S$ recycling.

The antimony sulfide alumina catalyst is used in the form of tablets which constitute a layer through which the reagents pass in vapor phase.

Since the catalyst used is fundamental for the success of the operation and for obtaining the advantages above described, in respect to the method known for the production of methyl mercaptan, the relevant description is hereunder given.

Activated alumina is at first prepared, as by precipitating with ammonia a solution of aluminum nitrate obtained by attack of alumina from a Bayer process with $HNO_3$.

The product, after having been filtered and washed, is drawn to small cylinders, of about 8 mm. of diameter and then dried.

600 g. of activated alumina are inbibed with 340 cc. of an aqueous solution of 0.4 mol of $SbCl_3$ and 1 mol of HCl.

After having dried the mass in an oven overnight at

125–130° C., it is treated with 400 cc. of an aqueous solution containing 240 g. of $Na_2S \cdot 9H_2O$ and is then continuously stirred while adding $H_2O$ until submerging the granules.

After 2 hours time, the non-absorbed liquid is decanted and the remaining mass is washed several times by decantation. Subsequently, the catalyst is placed in an oven and heated to 250° C. for three hours in a hydrogen sulfide stream. It is then granulated and made up in tablets of 12 mm. diameter and 4–5 mm. high. Apparent density: 0.91 kg./liter.

The antimony sulfide content is, in this case 5.3%, which is the value preferably used. It is, however, possible to prepare other catalysts, almost equally active, the $Sb_2S_3$ content of which may vary from 1 to 50% based upon the total weight of the antimony sulfide and the alumina.

The type of alumina used is not particularly important, provided it is activated. It is, moreover, clear that the catalyst herein described may be used either with a feed consisting of $H_2S$ and methanol, or of a mixture of the latter products with the dimethylsulfide by-product. The relatively small quantities of dimethylether obtained (2 to 3% of the methanol feed) may be recycled back together with the $H_2S$ without needing separating.

After the reaction the products obtained are cooled down to room temperature to condense the reaction water and then compressed to 2–10 atm. to condense the reaction products. Condensation is preferably carried out in a column, from the top of which the $H_2S$ is liberated to be recycled, while the raw product is collected at bottom. The distillation for separating the methyl mercaptan from the dimethylsulfide and from the impurities is carried out in a subsequent column.

The dimethylsulfide obtained from distillation may then be recycled back to the reactor along with the fresh feed, and the $H_2S$ recycled.

Alternatively, the dimethylsulfide may be transformed into methyl mercaptan by making $H_2S$ react in a second reactor on a clay or activated alumina catalyst. In this case the temperature of the second reactor is maintained between about 250 and 400° C., preferably at 300° C.

The space velocity calculated on the reactants varies from 20 to 200 normal liters, i.e., liters of gas converted as at zero degrees Celsius and 760 millimeters mercury, per hour per liter of catalyst and is preferably kept at a value of 80.

The $H_2S/(CH_3)_2S$ ratio may vary from a minimum of 0.5 to a maximum compatible with the economical operation of the process. The higher the $H_2S$ excess, the higher the conversion to mercaptan. For instance, with a molar ratio of 2.99 the conversion to mercaptan was of 29.5%, while with a ratio of 0.8 conversion was only of 15.6%.

The preferred value of that ratio was 1–2 since under these conditions the quantity of reactants acting for each mol of $(CH_3)_2S$ transformed is minimal.

Hence when operating according to the present invention, with a single reactor cycle as well as with a 2-reactor cycle, it is possible, by feeding methanol and hydrogen sulfide, to obtain as a reaction product only methyl mercaptan without obtaining undesirable by-products.

These results are also obtained by operating at temperatures and with $H_2S$/MeOH ratios which are the lowest among those so far used by other operators.

The following examples illustrate the invention as present preferred embodiments, but it is understood that the invention may be otherwise practiced within the spirit of this disclosure.

*Example 1*

Into a reactor containing a catalyst consisting of antimony sulfide on alumina, prepared in the manner described above, and maintained at the temperature of 275° C., was introduced a mixture of hydrogen sulfide and methanol in a molar ratio of 2.6:1 with a space velocity of 110 normal liters per hour per liter of catalyst.

The methanol conversion obtained was practically equal to 100% and was distributed in mols as follows:

| | Percent |
|---|---|
| $CH_3SH$ | 83.3 |
| $(CH_3)_2S$ | 9.69 |
| $(CH_3)_2O$ | 5.31 |
| Decomposed | 1.03 |

*Example 2*

Into a reactor containing an antimony sulfide and alumina base catalyst, a mixture consisting of hydrogen sulfide and methanol and dimethylsulfide vapors was introduced.

Operating at a temperature of 275° C. with a space velocity of 104 normal liters per hour per liter of catalyst and a molar ratio $H_2S/(CH_3)_2S+CH_3OH=2/1$, the same quantity of dimethylsulfide fed was found in the product obtained, while the methanol was completely converted to methyl mercaptan and to small quantities of dimethyl ether.

The $CH_3OH/(CH_3)_2S$ ratio in liquid volume in the feed was 1.67/1 (in mols 3:1).

*Example 3*

In a reactor containing activated alumina as a catalyst and kept at the temperature of 300° C., a mixture of $H_2S$ and $CH_3SCH_3$ vapors was introduced with a molar ratio of 2.41/1 at a space velocity of 80 normal liters per hour per liter of catalyst.

Conversion of dimethylsulfide to mercaptan was 28.2%, while the remainder passed substantially unaltered.

*Example 4*

Into a reactor containing activated clay of the type used with alcohol dehydration, as a catalyst, and kept at a temperature of 325° C., a mixture of $H_2S$ and $CH_3SCH_3$ vapors was introduced with a molar ratio of 2.41/1 and at a space velocity of 80 normal liters per hour per liter of catalyst. Conversion of dimethylsulfide to methyl mercaptan was of 27.25%, while the remainder passed substantially unaltered.

What is claimed is:

1. A process for preparing methyl mercaptan, which comprises passing a mixture of hydrogen sulfide and methanol vapors over a catalyst comprising antimony sulfide precipitated on alumina, containing from about 2% to about 50% by weight antimony sulfide at a temperature between about 200° C. and about 400° C., and recovering methyl mercaptan from the reaction products.

2. A process for preparing methyl mercaptan, which comprises passing a mixture of hydrogen sulfide and methanol and dimethyl sulfide vapors over an activated alumina catalyst containing from about 2% to about 50% by weight of antimony sulfide at a temperature ranging between about 200° C. and about 400° C., and recovering the reaction products.

3. The process of claim 1, in which the molar ratio of $H_2S/CH_3OH$ is between about 1 and about 20.

4. The process of claim 3, in which said ratio is between about 1.5 and 3.

5. The process of claim 2, in which the $H_2S/CH_3OH$ and $H_2S/CH_3OH+(CH_3)_2S$ molar ratios are kept between about 1 and 20.

6. The process of claim 5, in which said ratios are between about 1.5 and 3.

7. The process of claim 1, in which the reactants space velocity over the catalyst is maintained between about 20 and 300 normal liters per hour per liter of catalyst.

8. The process of claim 7, in which said space velocity is between about 80 and 110.

9. The process of claim 1, in which the catalyst contains from about 2% to 8% $Sb_2S_3$.

10. The process of claim 2, in which the catalyst contains from about 2 to 8% $Sb_2S_3$.

11. The process of claim 1, which the operation takes place at a temperature of from 250° to 320° C.

12. A process for preparing methyl mercaptan which comprises reacting hydrogen sulfide excess and methyl alcohol and optionally recycled dimethyl sulfide in a gaseous phase at 200 to 400° C., in the presence of a catalyst comprising antimony sulfide supported on activated alumina, said catalyst having antimony sulfide content lower than 25% and higher than 2% by weight based on the alumina at a space velocity between about 20 to about 300 normal liters per hour per liter of catalyst.

13. The process of claim 12, in which said space velocity is about 100 normal liters per hour per liter of catalyst.

References Cited in the file of this patent

UNITED STATES PATENTS

| | | |
|---|---|---|
| 2,116,182 | Baur | May 3, 1938 |
| 2,667,515 | Beach | Jan. 26, 1954 |
| 2,816,146 | Doumani | Dec. 10, 1957 |
| 2,831,031 | Binning et al. | Apr. 15, 1958 |